(12) United States Patent
Schroeder et al.

(10) Patent No.: US 6,705,067 B2
(45) Date of Patent: Mar. 16, 2004

(54) FEED CONVEYOR/ROCK TRAP AND HEADER DRIVE FOR AN AGRICULTURAL COMBINE

(75) Inventors: Jay D. Schroeder, Coal Valley, IL (US); William C. Guske, Geneseo, IL (US)

(73) Assignee: Case Corporation, Racine, WI (US)

( * ) Notice: Subject to any disclaimer, the term of this patent is extended or adjusted under 35 U.S.C. 154(b) by 87 days.

(21) Appl. No.: 10/196,011

(22) Filed: Jul. 16, 2002

(65) Prior Publication Data

US 2004/0014510 A1 Jan. 22, 2004

(51) Int. Cl.[7] .............................................. A01D 34/00
(52) U.S. Cl. ........................................ 56/14.6; 56/13.5
(58) Field of Search ................................ 56/14.6, 13.5, 56/10.2 R, 10.7, 15.8; 180/53.1

(56) References Cited

U.S. PATENT DOCUMENTS

| | | | |
|---|---|---|---|
| 2,236,002 A | | 3/1941 | Lederer .......................... 56/21 |
| 2,999,347 A | * | 9/1961 | Horne et al. ................... 56/11.8 |
| 3,535,859 A | | 10/1970 | Adams ........................... 56/21 |
| 4,009,556 A | * | 3/1977 | Molzahn ....................... 56/10.7 |
| 4,587,799 A | | 5/1986 | Thomas et al. .............. 56/14.6 |
| 4,843,803 A | | 7/1989 | Teijido et al. ............... 56/14.6 |
| 4,967,863 A | * | 11/1990 | Teijido et al. .............. 180/53.1 |
| 5,005,342 A | | 4/1991 | Lundahl et al. ............... 56/10.2 |
| 5,327,709 A | * | 7/1994 | Webb ........................... 56/15.8 |
| 5,497,605 A | | 3/1996 | Underwood et al. .......... 56/14.6 |
| 5,795,222 A | | 8/1998 | McLeod ........................ 460/97 |
| 5,904,032 A | | 5/1999 | Rippel .......................... 56/14.6 |

* cited by examiner

Primary Examiner—Arpad F Kovács
(74) Attorney, Agent, or Firm—John William Stader; Rebecca L. Henkel

(57) ABSTRACT

A rotatable drive for a feeder and a header of an agricultural combine for drivingly connecting spaced rotatable elements on the feeder and the header to a rotatable power source on a chassis of the combine, the feeder and the header being jointly mounted to the chassis for pivotal movement relative thereto about a predetermined pivotal axis through a predetermined range of harvesting positions. The drive includes a first gear box mounted on the feeder for pivotal movement therewith and including a rotatable input, a first rotatable output rotatably connected to the input and to at least one of the rotatable elements, and a second rotatable output rotatably connected to the input. The drive includes a second gear box mounted on the feeder and having a rotatable input rotatably connected by a drive shaft to the second output of the first gear box and at least one rotatable output connected to another of the rotatable elements. A plurality of drive shafts are rotatably connected in end to end relation one to the other, respectively, between the rotatable input of the first gear box and the rotatable power source on the chassis of the combine, one of the drive shafts being rotatably connected by universal joints on opposite ends thereof to another of the drive shafts and to the input of the first gear box, respectively, and having an axial center portion intersecting or located substantially coincident with the pivotal axis when the feeder and header are within the range of harvesting positions.

21 Claims, 7 Drawing Sheets

US 6,705,067 B2

FEED CONVEYOR/ROCK TRAP AND HEADER DRIVE FOR AN AGRICULTURAL COMBINE

TECHNICAL FIELD

This invention relates generally to a drive for a feed conveyor, rock trap beater, and header of an agricultural combine, and more particularly, to a drive for transferring rotatable power from a power source located on the main combine chassis to the feed conveyor, rock trap beater, and header, utilizing a series of drive shafts, universal joints, and gear boxes, which provides more efficient power transmission, is less bulky and has improved durability and reliability and requires less maintenance than drives utilizing belts and/or chains.

BACKGROUND ART

It is well known to utilize drive shafts, universal joints, and gear boxes in various combinations with drive belts and/or chains, for transferring power from a power source on the main chassis or frame of a combine, such as an internal combustion engine, to a feed conveyor, rock trap beater, and/or header on the forward end of the combine. Reference in this regard, Adams U.S. Pat. No. 3,535,859, issued Oct. 27, 1970 to International Harvester Company which discloses a header construction for a combine having a drive system including a combination of drive shafts, universal joints, and a gear box, which received power from a belt drive. Reference also Rippel U.S. Pat. No. 5,904,032, issued May 18, 1999, which discloses a belt driven header and feed conveyor which receives power through a drive shaft and universal joints.

However, limitations of the above-discussed power transmission arrangements include reduced power transmission efficiency resulting from the use of drive belts and/or chains; complex and bulky safety shielding required for the belts and/or chains, particularly when transmitting power across spaces to powered elements articulatable relative to the main chassis such as a feeder and header. Such shortcomings limit the header drive power potential and serviceability, and increase machine width, each of which can be disadvantageous.

Additionally, the front wheels of a combine are typically positioned beside and outwardly of the rearward end of the feed conveyor and the forward end of the main chassis frame of the combine, and in some instances, it may be desirable for the front wheels to be steerable. As a result, the lateral space between the wheel and the drive arrangement for the feed conveyor and header may additionally reduce the amount of space or clearance for turning the wheels, thereby limiting the steerability of the combine.

Thus, what is sought is a drive for the feed conveyor, header, and optionally a rock trap beater, of an agricultural combine which overcomes many of the shortcomings and limitations discussed above.

SUMMARY OF THE INVENTION

According to the present invention, a rotatable drive for a feeder and a header of an agricultural combine for connecting spaced rotatable elements on the feeder and the header to a rotatable power source on a chassis of the combine, which overcomes many of the shortcomings and limitations discussed above, is disclosed. The feeder and the header are jointly mounted to the chassis for pivotal movement relative thereto about a predetermined pivotal axis through a predetermined range of harvesting positions. The present drive includes a first gear box mounted on the feeder for pivotal movement therewith and including a rotatable input, a first rotatable output rotatably connected to the input and to at least one of the rotatable elements, and a second rotatable output rotatably connected to the input. The drive includes a second gear box mounted on the feeder and having a rotatable input rotatably connected by a drive shaft or transfer shaft to the second output of the first gear box and at least one rotatable output connected to another of the rotatable elements. A plurality of drive shafts are rotatably connected in end to end relation one to the other, respectively, between the rotatable input of the first gear box and the rotatable power source on the chassis of the combine, one of the drive shafts being rotatably connected by universal joints on opposite ends thereof to another of the drive shafts and to the input of the first gear box, respectively, and having an axial center portion intersecting or located substantially coincident with the pivotal axis when the feeder and header are within the range of harvesting positions.

According to a preferred aspect of the invention, the rotatable elements on the feeder include a conveyor and an optional rock trap beater. According to an optional preferred aspect of the invention, the output and drive shaft or transfer shaft connecting to the second gear box are offset sidewardly toward the side of the feeder from the input of the first gear box so as to provide a space or clearance for turning of an adjacent steerable wheel of the combine.

BRIEF DESCRIPTION OF THE DRAWINGS

FIG. 10 is a simplified top schematic representation of the forward end of the combine of FIG. 1 and the drive of FIG. 9, with forward steerable drive wheels of the combine shown turned.

DETAILED DESCRIPTION OF THE INVENTION

Figure 1:
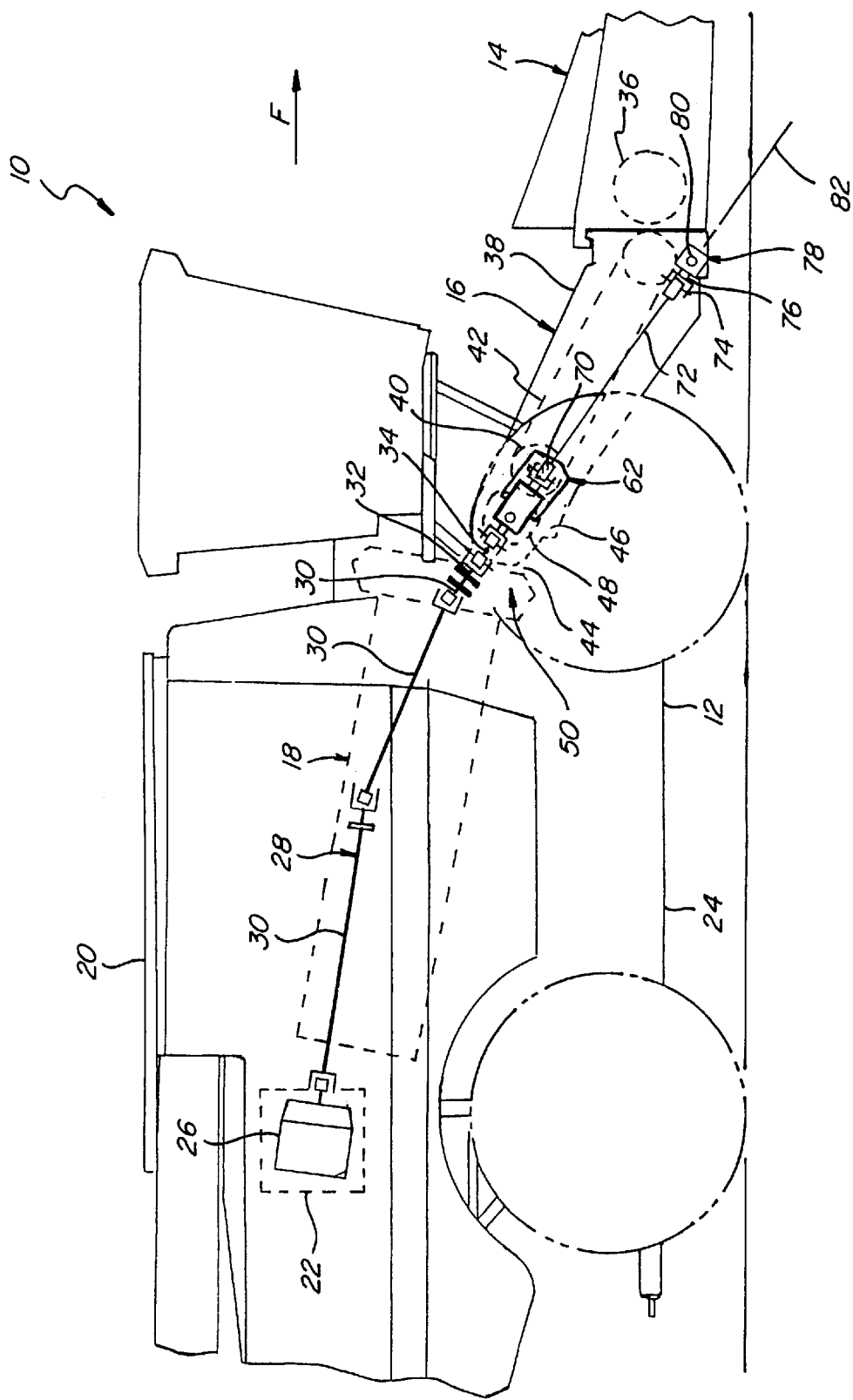
FIG. 1 is a simplified side elevational view of an agricultural combine including a drive according to the invention for a feeder, a rock trap beater, and a header of the combine.

Referring now to the drawings, in FIG. 1 a self-propelled agricultural combine 10 movable in a forward direction, denoted by arrow F, for harvesting and separating crops, such as, but not limited to, grains including rice, wheat, soybeans, and corn, is shown. Combine 10 includes a forward end 12 carrying a conventional header 14 extending transversely thereacross in close proximity to the ground for gathering and cutting or otherwise separating crop materials or desired portions thereof from root structure thereof in the ground. The crop or plant or portions thereof are conveyed by header 14 to a feeder 16 which conveys the plant material to a separator 18 which separates the grain or other crops from the other plant materials and foreign material, the crops either being temporarily collected in a bin 20 on machine 10 or discharged to an accompanying wagon or truck (not shown).

Combine 10 is propelled by a conventional power plant such as an internal combustion engine 22 and a hydraulic and/or mechanical drive train (not shown) mounted on a main frame or chassis 24 of combine 10 in the well known conventional manner. Engine 22 is rotatably drivingly connected to a gear box 26 also located on chassis 24 by a hydraulic or mechanical drive (not shown), gear box 26 including a gear arrangement drivingly connected to a drive line 28 of the present invention including a plurality of drive shafts 30 connected together in end to end relation and extending forwardly and downwardly to an output end 32 of one of the drive shafts 30 located at or closest to forward end 12 of chassis 24.

Figure 2:
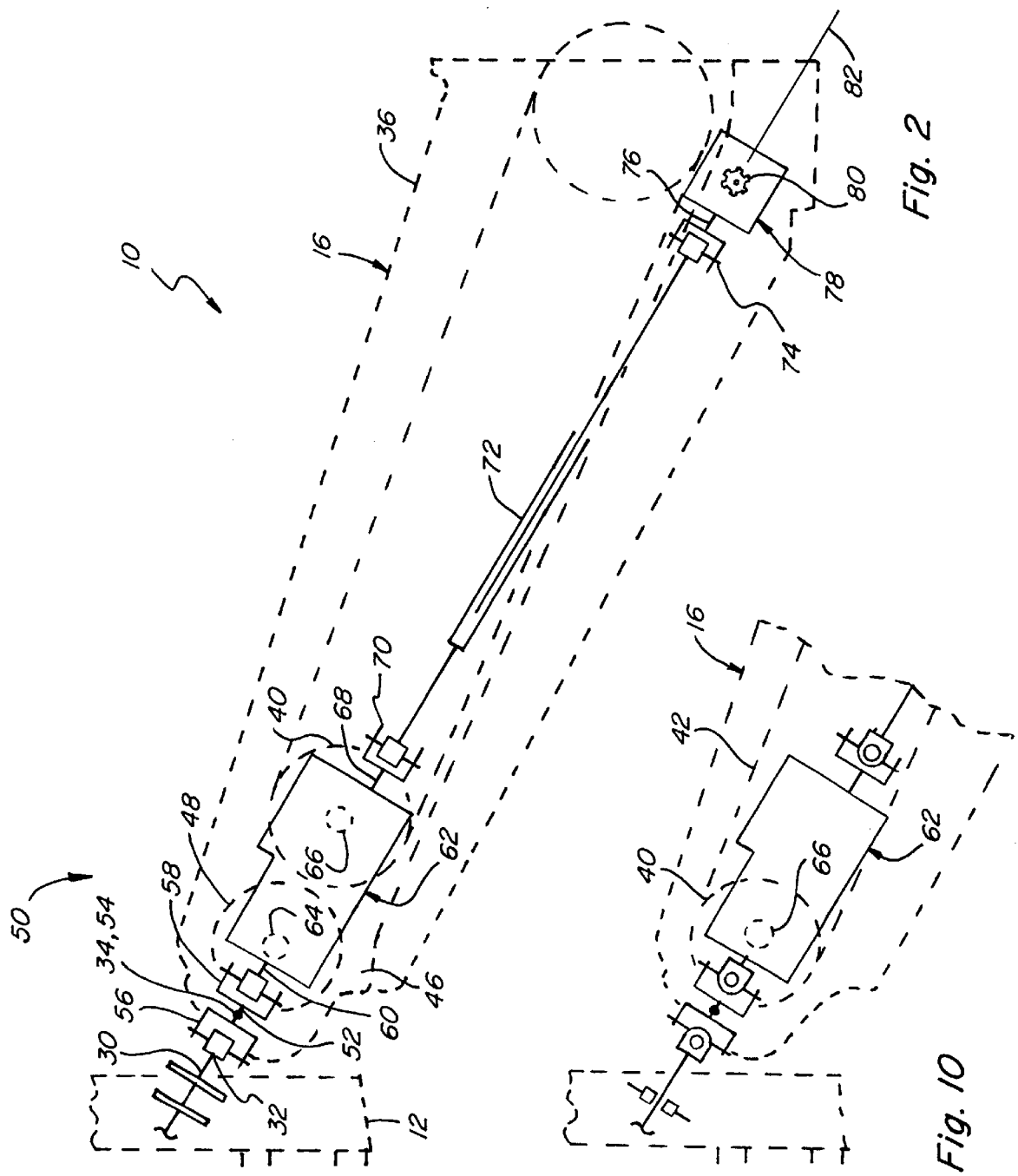
FIG. 2 is a simplified schematic side elevational representation of the drive of FIG. 1.
Figure 3:
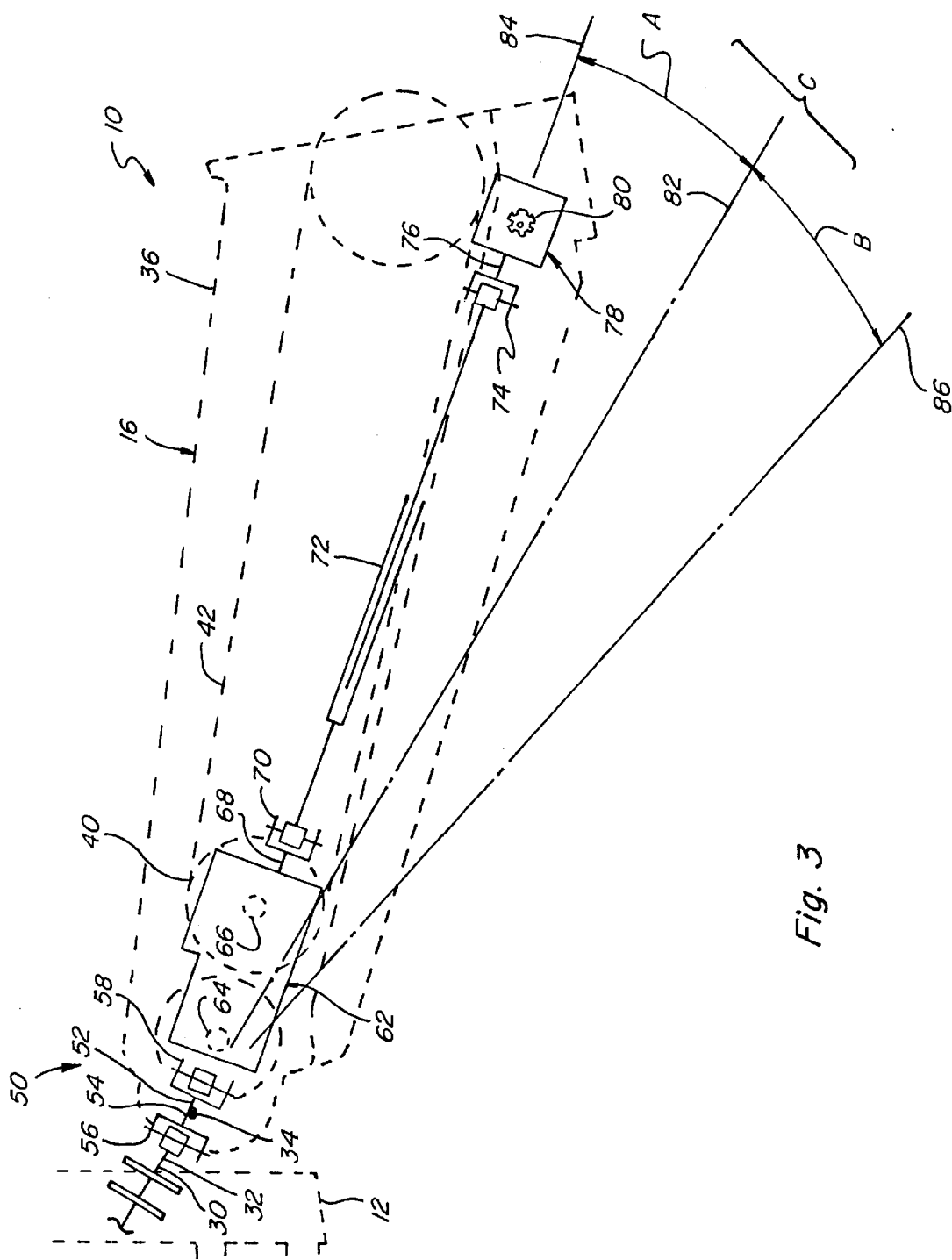
FIG. 3 is another simplified schematic representation of the drive of FIG. 1, shown pivoted to an alternative position.

Referring also to FIGS. 2 and 3, feeder 16 is conventionally connected to forward end 12 for upward and downward pivotal movement relative to combine 10 about a generally horizontal pivotal axis 34, for positioning header 14 in any of a range of lower positions close to the ground, including a low position for releasing or disconnecting header 14 therefrom when resting on the ground or another location, and at least one elevated transport or road position, including a position sufficiently high for placing header 14 on a header cart or other transport or storage device (not shown). Header 14 illustrated in FIG. 1 is a non-limiting representative header including one or more augers, denoted at 36, gathering chains, sickles, and/or other rotatably driven elements (not shown) of well known, conventional construction and operation, for cutting, harvesting and gathering crops as combine 10 is moved in the forward direction denoted by arrow F and header 14 is in a harvesting position, such as shown in FIG. 1. Feeder 16 includes a housing 38 of sheet metal or other rigid construction containing and supporting a forwardly located rotatable drum or roller and a rearwardly and upwardly located series of sprockets 40 encircled by an endless belt or chains 42, including slats or other elements thereon operable for conveying the harvested and gathered crops from header 14 upwardly and rearwardly through housing 38 for discharge into an inlet or infeed region 44 of separator 18 on chassis 24 of combine 10. From time to time, stones, rocks, and other hard, dense items or objects such as large sticks, logs, driftwood, large animal bones, portions of old fence posts, and the like, may be picked up by header 14, gathered by auger 36, and conveyed rearwardly and upwardly by chains 42 through housing 38 of feeder 16 toward infeed region 44 of separator 18. Separators, such as separator 18 depicted here, are precise devices, and include components that could be damaged by contact with such stones, rocks, and other hard objects. To reduce the number of such hard objects infed to separator 18, particularly larger objects, a feeder such as feeder 16 can optionally include a rock trap such as depicted at 46, at a location such as just rearwardly of and below sprockets 40, for receiving and holding such objects conveyed thereto by chains 42, before the objects would otherwise be infed into separator 18. A rock trap such as depicted at 46 may also optionally include a rotatable beater, denoted at 48, for separating the rocks or other hard objects from the softer plant material as it moves on to the separator 18, in a well known conventional manner.

Beater 48 of rock trap 46, sprockets 40 of feeder 16, and auger 36 and the other rotatable elements of header 14 must receive adequately rotational power to perform their respective functions, particularly so as to provide a desired rate of infeed of crops into separator 18, without becoming jammed, clogged, and/or bogged down with crop material, leaves, and the like. It is well known to utilize a drive belt or belts and/or drive chains, in combination with one or more drive shafts, for rotatably driving a header, feeder, and/or rock trap beater, such as items 14, 16 and 48 here. However, it has been found that belt drives and chain drives have numerous undesirable limitations, including, but not limited to, large space requirements, relatively lower power transmission efficiency for a given space occupied by the belt or chair drive and guards therefor, compared to a drive shaft under the same constraints. Belt and chain drives also generally generate more heat, and have greater service requirements.

Referring also to FIGS. 2 and 3, to eliminate the above discussed disadvantages, combine 10 utilizes a solely shaft drive 50 according to the present invention for drivingly rotating the rotatable elements of header 14, feeder 16, and rock trap 46, including, but not limited to, auger 36, sickles, gathering chains or other apparatus (not shown) on header 14, sprockets 40 on feeder 16, and optionally beater 48 of rock trap 46. Drive 50 importantly includes a short input drive shaft 52 having an axial center portion 54 disposed equidistant between an end thereof including a first universal joint 56 driveably connecting input drive shaft 52 to output end 32 of the closest drive shaft 30 on chassis 24, and an opposite end including a second universal joint 58 rotatably connecting input drive shaft 52 to a rotatable input 60 of a feeder and rock trap gear box 62 mounted on the near side of feeder 16. Universal joints 56 and 58 are each preferably a conventional Hooke or Cardan type universal joint having angularly related yokes connected respectively to the drive shafts and a cross link connecting the yokes together for pivotal movement one relative to the other. This short shaft, double universal joint arrangement, enables the rotational velocity of driven input 60 to at least substantially match that of closest drive shaft 30, through an anticipated range of pivotal relationships between shaft 30 and input 60 corresponding to the pivotal positions of feeder 16 relative to combine 10. Feeder and rock trap gear box 62 is mounted to feeder 16 so as to be pivotally movable therewith about pivotal axis 34. Gear box 62 includes a rotatable output 64 extending transversely to the axis of input 60 and rotatably drivingly connected to beater 48, a transversely extending rotatable output 66 rotatably drivingly connected to sprockets 40, and an axially extending rotatable output 68 connected by a universal joint 70 to one end of a transfer shaft 72. Shaft 72 is preferably a telescoping type drive shaft for ease of assembly and disassembly and includes an opposite end connected by another universal joint 74 to a rotatable input 76 of a header gear box 78. Header gear box 78 is mounted on a forward end of feeder 16 and includes at least one transversely extending rotatable output 80 which is a conventional splined stub shaft or the like connectable in the normal and well known manner to a drive shaft (not shown) connected to auger 36 and the other rotatable elements of header 14 discussed above.

Referring more particularly to FIGS. 1 and 2, feeder 16 is shown in a representative or selected middle position within a predetermined range of harvesting position about pivotal axis 34 such that input drive shaft 52 and input 60 of gear box 62 are substantially coaxial with the closest drive shaft 30 of combine 10, as represented by axial line 82. Importantly, in this position, axial line 82 intersects or very nearly intersects or substantially coincides with pivotal axis 34. Output 68 of gear box 62, transfer shaft 72, and input 76 of header gear case 78 are at least in the same plane as axial line 82, which relationship is advantageous for reasons discussed below.

FIG. 3 shows feeder 16 in a raised transport or header pick up position wherein the axis of input 60, denoted by axial line 84, is angularly offset from original axial line 82, as denoted by angle A. Another axial line 86 is shown in FIG. 3 beneath lines 82 and 84 and angularly related to line 82 by the angle B. This represents the axis of input 60 when feeder 16 is at a lower position just above or on the ground and at which the lower portions of feeder 16 can be separated from the header to allow disconnection and removal of the header from feeder 16. The feeder and header will typically not be operated at this orientation and this is not considered to be a harvesting or operating position. FIG. 3 also shows a representative predetermined range of harvesting positions, denoted at C, for the axis of input 60 and feeder 16 when feeder 16 is positioned for positioning a header thereon such as header 14 for harvesting. Range C can vary for different field conditions, crop conditions, and headers, as well as operator preference, and other factors, and thus is not intended to be limiting. However, it should be understood that range C will typically fall within the positions denoted by axial lines 84 and 86, each of which is oriented about a 10° angle relative to axial line 82, as denoted by angles A and B, respectively. Thus, for representative purposes only, range C is depicted as having a value of about 8°. Here, it should be noted that angles A and B are not intended to represent the upward and downward limits of movement of feeder 16. For instance, a typical feeder such as feeder 16 shown will have a range of movement of about 26° or so, mostly in the upward direction from axis 82.

Due to the combination of the relatively short length of input drive shaft 52, the use of universal joints 56 and 58, and the positioning of axial center portion 54 intersecting or nearly intersecting or substantially coincident with pivotal axis 34 when feeder 16 is in a central or middle harvesting position, when feeder 16 is pivotally moved upwardly or downwardly about pivotal axis 34, particularly within range C, universal joints 56 and 58 pivot equally and by only a very small amount, equal to about half the angular amount that feeder 16 is pivoted. As a result of this combination it has been found that there are relatively small tensile loads exerted on shaft 52 urging it to elongate or otherwise change the distance between universal joints 56 and 58 as shaft 52 is rotated. These leads are easily accommodated by allowing universal joint 58 to slide in the axial direction on input 60, such that input shaft 52 is not required to be a telescoping shaft, and little or no additional power loss, heat buildup, increase in wear, or velocity variation of the driven shaft, are experienced.

Figure 4:
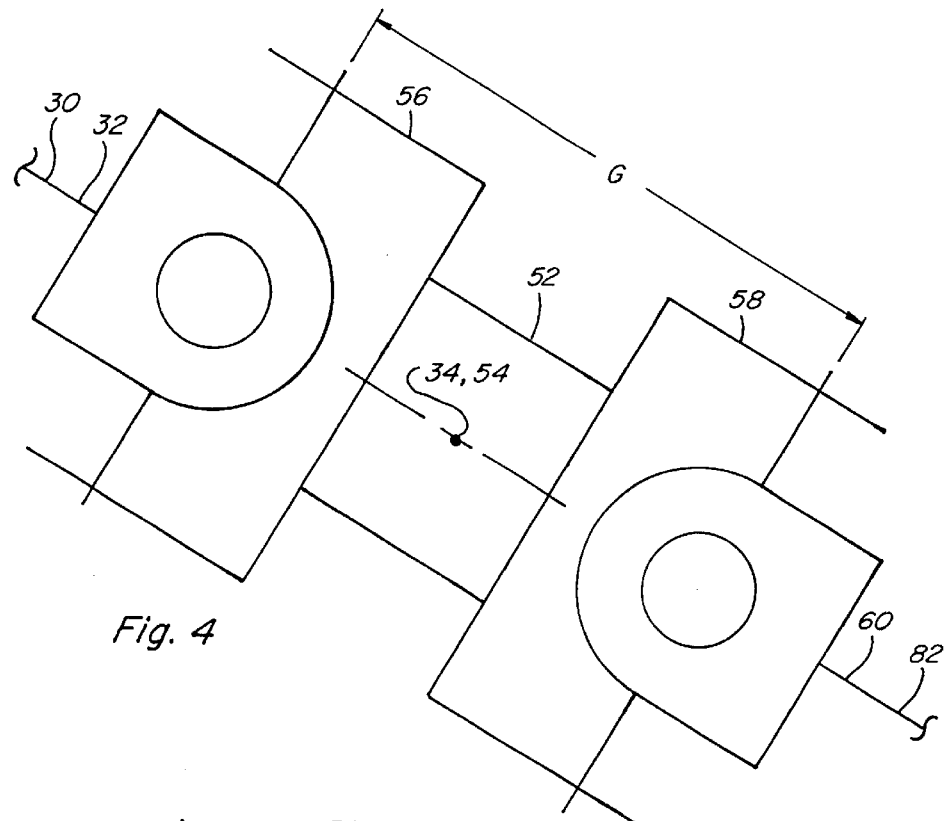
FIG. 4 is an enlarged simplified side elevational schematic representation of elements of the drive of the invention.

As illustrations of this desirable result, in FIGS. 4, 5, 6, and 7, schematic representations of input drive shaft 52, universal joints 56 and 58, end 32 of closest drive shaft 30, and input 60, are shown when those items are in the above discussed positions. In FIG. 4, drive shaft 52, universal joints 56 and 58, end 32 of closest drive shaft 30, and input 60 are shown coaxially aligned along axial line 82, as in FIGS. 1 and 2. In this position, axial line 82 intersects pivotal axis 34, such that axial center portion 54 of drive shaft 52 is substantially coincident with pivotal axis 34. Alignment of shafts 30 and 52 with input 60 represents the optimal power transmission relationship, with minimized power loss, heat generation and wear in universal joints 56 and 58, and loading on shaft 52. In this aligned orientation, shaft 52 has a length between the pivotal axes of joints 56 and 58, denoted at G.

Figure 5:
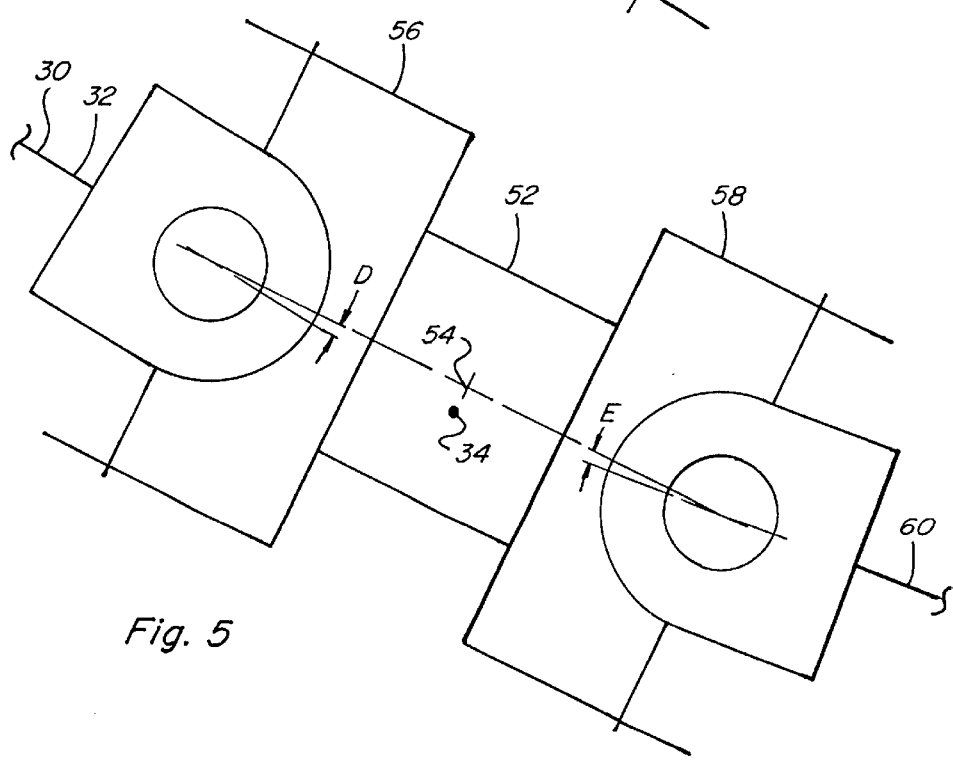
FIG. 5 is another enlarged simplified side elevational schematic representation of the elements of FIG. 4 in one alternative position.

In FIG. 5, a similar schematic shows input 60 pivotally displaced upwardly about pivot axis 34 by about 10°, which represents a typical high pivotal position of feeder 16 shown in FIG. 3. With input 60 in this position, due to the short length of drive shaft 52, axial center portion 54 thereof is displaced a small distance above pivotal axis 34, and first and second universal joints 56 and 58 are each pivoted an equal amount of about 5°, as denoted by angles D and E, which is about half the angular displacement of input 60. This illustrates a position wherein a higher anticipated tensile loading condition would be present were the drive to be rotating. However, it is expected that the header and feeder would be operated when in a high position such as this only rarely, for instance if combine 10 were crossing a waterway or other depression in a field, such that it is not anticipated to be a problem.

Figure 6:
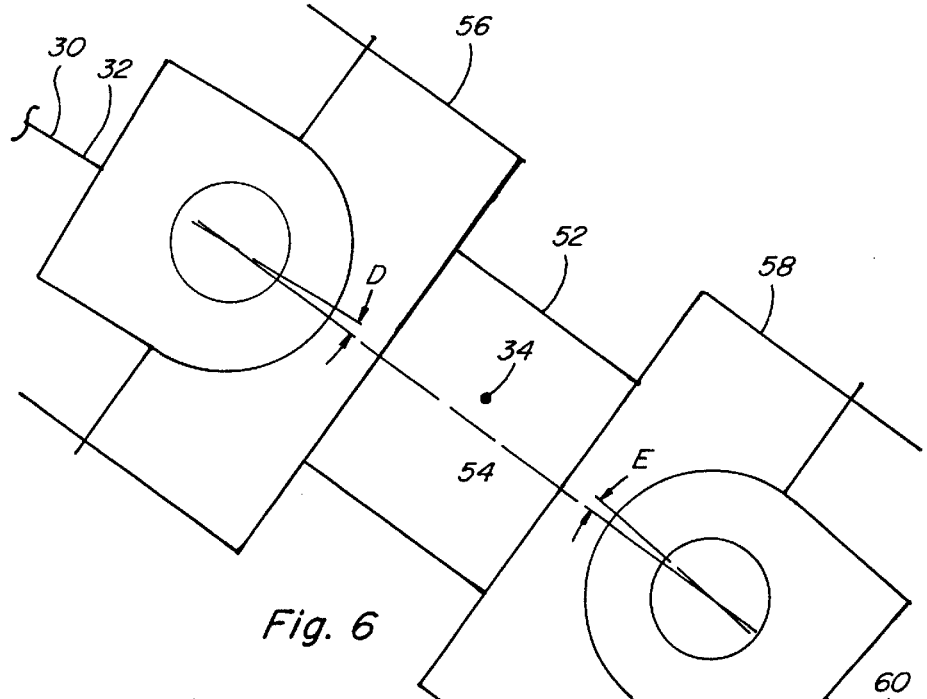
FIG. 6 is another enlarged simplified side elevational schematic representation of the elements of FIG. 4 in another alternative position.

In FIG. 6, input 60 is shown pivoted downwardly about pivotal axis 34 by an amount of about 10° which places the axis therethrough at or just above axial line 86 in FIG. 3. This corresponds to a position wherein header 14 will be very close to the ground and not likely operating. In this instance, center portion 54 of drive shaft 52 is located just below pivotal axis 34 and universal joints 56 and 58 are each pivoted by an amount of about one-half the 10° angle or about 5° as denoted by angles D and E. Again, this represents one of the positions wherein a high anticipated tensile loading condition would be present were the drive to be rotating.

Figure 7:
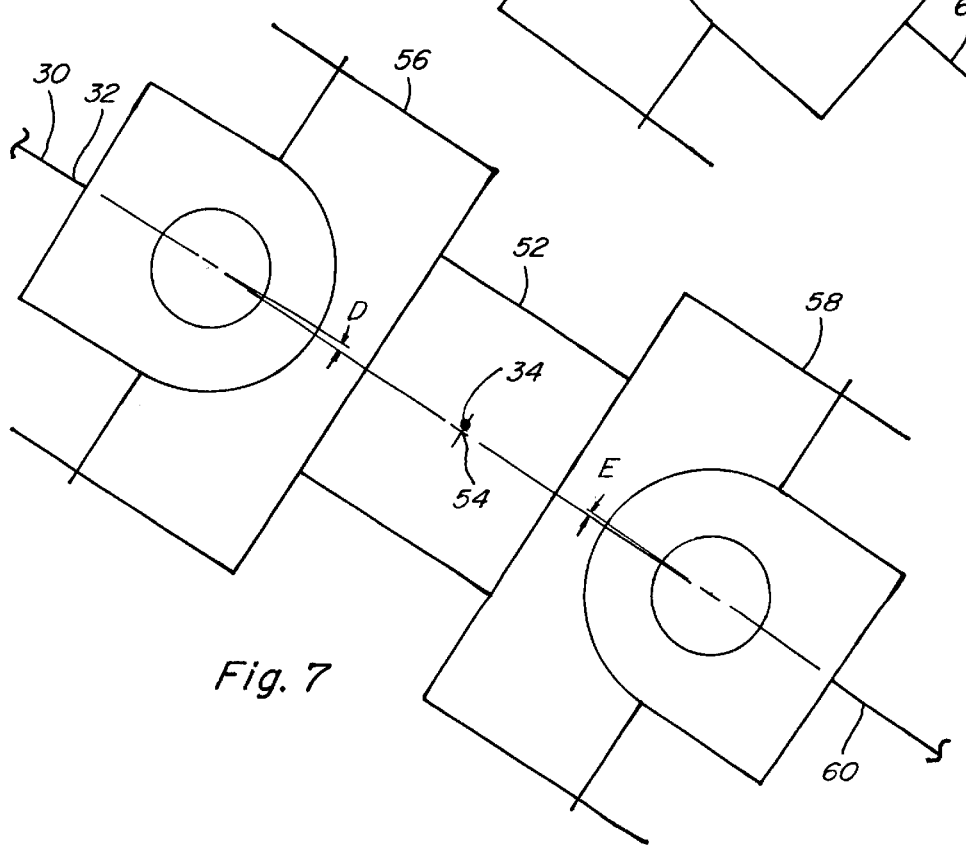
FIG. 7 is a simplified top schematic representation of the drive of FIG. 1.

In FIG. 7, input 60 is shown pivoted downwardly about pivotal axis 34 by an amount of about 4° from the center or middle range position shown in FIG. 2, which places the axis therethrough at a position within a lower portion of the range C in FIG. 3. This corresponds to a position of header 14 and feeder 16 in an anticipated lower harvesting position, just below that illustrated in FIG. 1. In this instance, center portion 54 of drive shaft 52 is located just below pivotal axis 34 and universal joints 56 and 58 are each pivoted by an amount of about one-half the 4° angle or about 2° each as denoted by angles D and E. In this position, tensile loads on shaft 52 urging elongation would be sufficiently low, even as the drive is rotated under heavy loads anticipated during harvesting, so as to be negligible and adequately resisted or absorbed by normal elongation of and/or endplay in the components of the drive.

Thus, during operation of the header such as header 14 and feeder 16, whether feeder 16 is pivoted about pivot axis 34 upwardly or downwardly within an anticipated range of pivotal harvesting positions, generally denoted by range C in FIG. 3, universal joints 56 and 58 will be only minimally pivoted and shaft 52 will be subjected to only minimal elongation or tensile loading, such that power transmission capability is preserved, and heat generation and wear are minimized.

Figure 8:
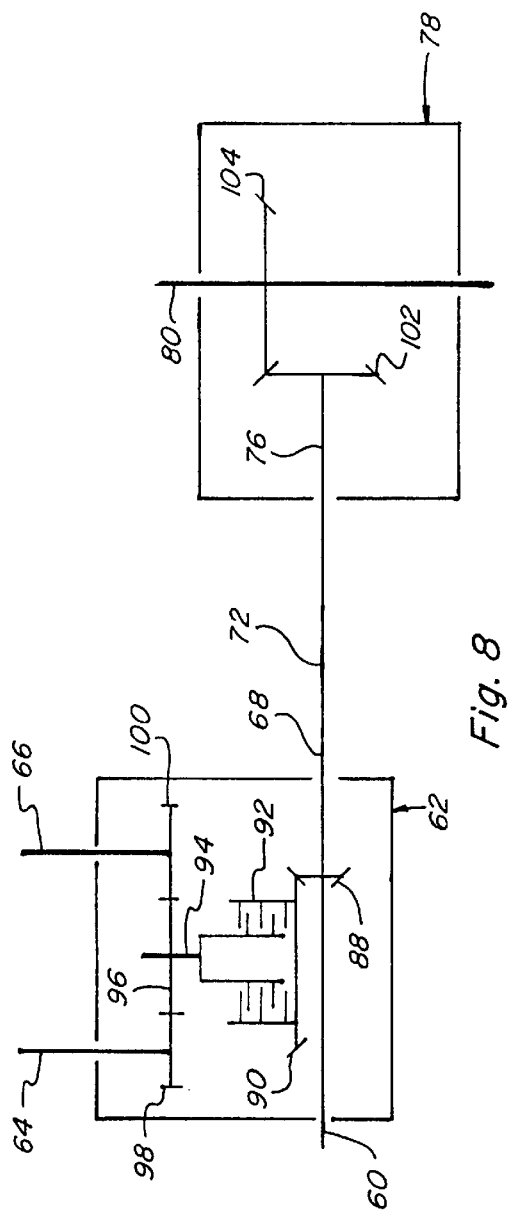
FIG. 8 is a simplified top schematic representation of an alternative drive according to the invention for the feed conveyor and header of the combine of FIG. 1.

Turning to FIG. 8, a simplified schematic top representation of feeder and rock trap gear box 62, transfer shaft 72, and header gear box 78 is shown. Input 60 includes a first bevel gear 88 mounted thereon for rotation therewith, enmeshed with a second bevel gear 90 connected to an input of an optional slip clutch 92. An output 94 of slip clutch 92 includes a gear 96 enmeshed with output gears 98 and 100 which are mounted to outputs 64 and 66, respectively, drivingly connected to beater 48 of rock trap 46 and sprockets 40 of feeder 16, respectively. Output 68 is mounted to and coaxial with input 60 and is connected by a transfer shaft 72 to input 76 of header gear box 78, as explained above. Input 76 includes a bevel gear 102 mounted thereon for rotation therewith enmeshed with a bevel gear 104 mounted on output 80 for rotation therewith, output 80 being connected to the rotatable elements of header 14, as explained above.

Using the arrangement of FIG. 8, sprockets 40 of feeder 16 and beater 48 of rock trap 46 are jointly driven in the same direction, as desired and required, such that there is no need for a separate rock trap beater drive. Additionally, overload protection is provided to both outputs 64 and 66 using only one slip clutch, which provides torque overload protection in either forward or reverse directions of operation. Further, by the axial alignment of input 60 and output 68, sufficient lateral or sideward compactness is achieved.

Figure 9:
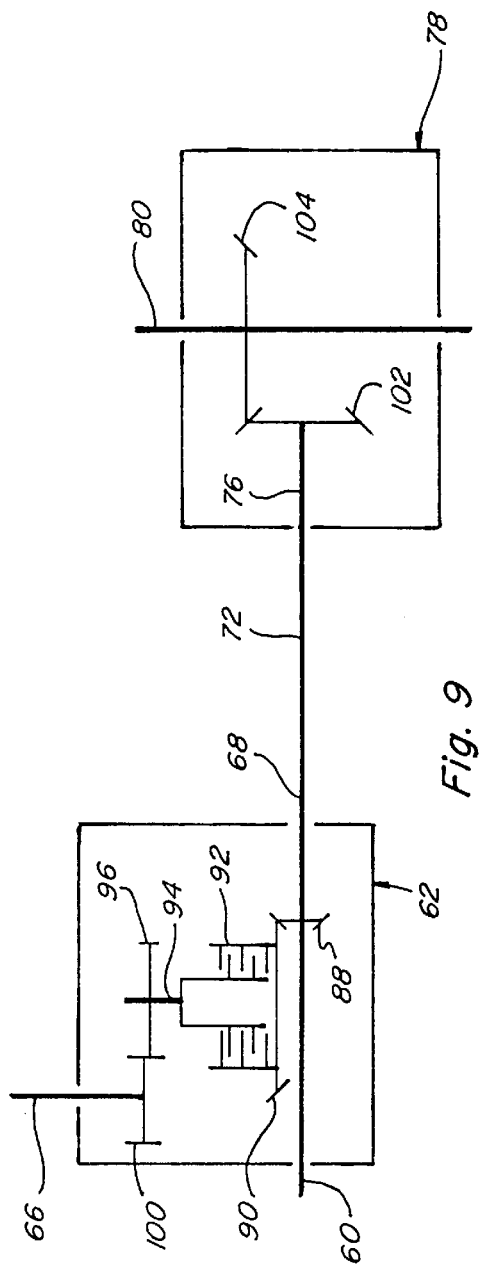
FIG. 9 is a simplified top schematic representation of another alternative drive for the feed conveyor, rock trap, and header of the combine of FIG. 1.

Turning to FIGS. 9 and 10, outputs 64 and 66 are interchangeable and gear box 62 is shown optionally configured to eliminate output 64 for rock trap beater 48, for applications wherein a rock trap beater is not required or desired. To configure gear box 62 in this manner, output 64 and gear 98 shown in FIG. 8 are not installed, or are removed, and output 66 and gear 100 are used instead at that location, and the opening in gear box 62 for output 66 shown in FIG. 8 is suitably plugged. This will require positioning sprockets 40 more rearwardly in feeder 16, in the position previously occupied by beater 48, necessitating that a longer belt or chain 42 be used due to the greater span, such that too large of a gap is not present between sprockets 40 and the infeed region of separator 18 (FIG. 1).

Figure 11:
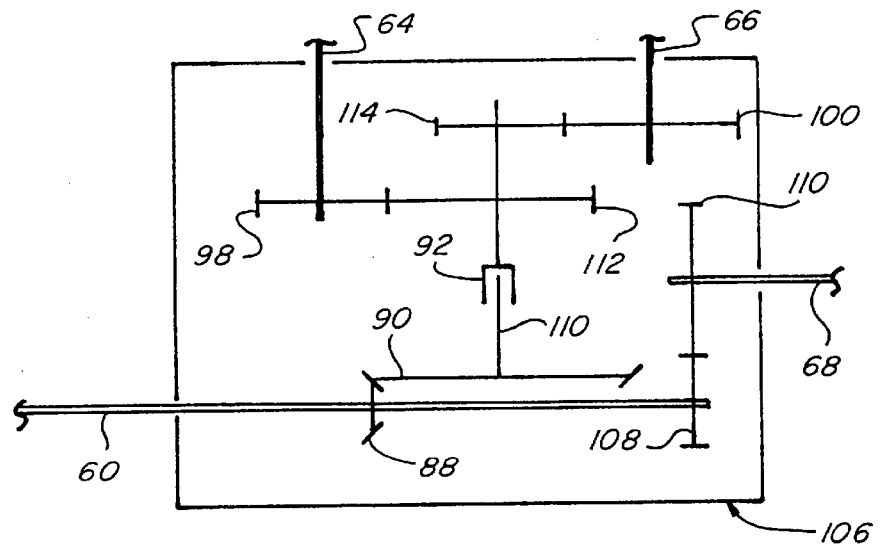
FIGS. 11 and 12 are an alternative feeder and rock trap gear of the feeder.
Figure 12:
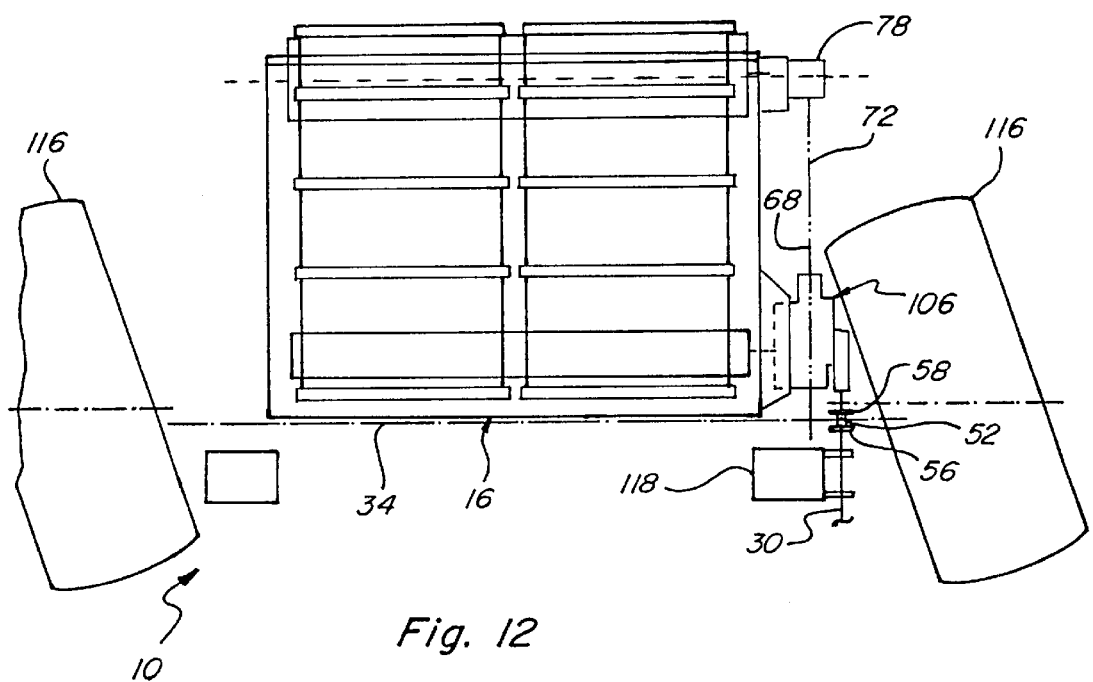

Turning to FIGS. 11 and 12, an alternative feeder and rock trap gear box 106 for drive 50 is shown which provides a sideward offset between input 60 and output 68 extending to header gear box 78. In this arrangement, input 60 still includes bevel gear 88 enmeshed with a bevel gear 90 for rotatably driving outputs 64 and 66, but instead of direct connection to output 68 and thus to transfer shaft 72 as above, input 60 includes a gear 108 enmeshed with a gear 110 on output 68 connected to transfer shaft 72. This enables output 68 to be offset sidewardly and inwardly of input 60 as shown in FIG. 12. Referring more particularly to FIG. 12, gear box 106 is shown mounted on the side of feeder 16 beside a forward steerable wheel 116 of combine 10, wheel 116 being shown turned to the left. Input 60 is connected to and aligned with forwardmost drive shaft 30 by drive shaft 52 and universal joints 56 and 58 as above. Drive shaft 52 is centered on pivotal axis 34 of feeder 16. Drive shaft 30 is located beside and outside of a forward frame post 118 of combine 10. Advantageously, by offsetting output 68 of gear box 106 from input 60 in the inward sideward direction, a space or clearance is provided to allow turning wheel 116 to a position such as shown, without rubbing or otherwise contacting transfer shaft 72.

Returning to FIG. 11, bevel gear 90 is mounted on a shaft of a transverse drive line 110 optionally including a slip clutch 92. Drive line 110 additionally includes gears 112 and 114 enmeshed with gears 98 and 100, respectively, on outputs 64 and 66 connected to rock trap beater 48 and sprockets 40, as above. Because separate gears 112 and 114 are utilized for driving outputs 64 and 66, those outputs may be driven at different, selectable ratios to the speed of drive line 110. This arrangement could likewise be used in gear box 62. Versatility is also provided to allow use of gear case 106 for driving just feeder 16, without the optional rock trap beater, by utilizing output 66 in place of output 64 similarly as described above.

As noted above input drive shaft 52 is indicated as being relatively short. Preferably drive shaft 52 will have a length G as shown in FIG. 4 of less than about 12 inches, and more preferably between about 6 to 10 inches, to provide the advantages set forth above.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates several preferred embodiments of the invention and methods of operation of the same; however, concepts, as based upon the description, may be employed in other embodiments without departing from the scope of the invention. Accordingly, the following claims are intended to protect the invention broadly as well as in the specific form shown.

What is claimed is:

1. A rotatable drive for a feeder and a header of an agricultural combine for drivingly connecting spaced rotatable elements on the feeder and the header to a rotatable power source on a chassis of the combine, the feeder and the header being jointly mounted to the chassis for pivotal movement relative thereto about a predetermined pivotal axis through a predetermined range of harvesting positions, the drive comprising:

a first gear box mounted on the feeder for pivotal movement therewith and including a rotatable input, a first rotatable output rotatably connected to the input and to at least one of the rotatable elements, and a second rotatable output rotatably connected to the input;

a second gear box mounted on the feeder and having a rotatable input rotatably connected by a drive shaft to the second output of the first gear box and at least one rotatable output connected to another of the rotatable elements; and a plurality of drive shafts rotatably connected in end to end relation one to the other, respectively, between the rotatable input of the first gear box and the rotatable power source on the chassis of the combine, one of the drive shafts being rotatably connected by universal joints on opposite ends thereof to another of the drive shafts and to the input of the first gear box, respectively, and having an axial center portion located substantially coincident with the pivotal axis when the feeder and header are within the range of harvesting positions.

2. The drive of claim 1, wherein the first rotatable output is rotatably connected to a rotatable element of a feed conveyor on the feeder and the first gear box includes a third rotatable output rotatably connected to the input of the first gear box and to a rock trap beater on the feeder.

3. The drive of claim 2, wherein the first rotatable output and the third rotatable output are rotatably connected to the input by a drive line including a slip clutch.

4. The drive of claim 2, wherein the third output is located at a predetermined position on the first gear box and is removable therefrom and replaceable by the first rotatable output.

5. The drive of claim 1, wherein the input of the first gear box is rotatable about a first axis and the second output is rotatable about a second axis parallel to and offset from the first axis in a direction toward the feeder.

6. The drive of claim 2, wherein the first and third outputs are interchangeably positioned on the first gear box.

7. The drive of claim 1, wherein the one of the drive shafts has a length of about 6 to about 12 inches between pivots of the universal joints, respectively.

8. The drive of claim 1 wherein the range of harvesting positions comprises about 8 degrees of pivotal movement about the pivotal axis.

9. The drive of claim 1, wherein said one of the drive shafts, said another of the drive shafts, and the input of the first gear box are substantially axially aligned when the feeder is in a central region of the range of harvesting positions.

10. The drive of claim 1, wherein the rotatable power source comprises an internal combustion engine rotatably drivingly connected to a gear arrangement.

11. An agricultural combine, comprising:
a chassis supported on a plurality of wheels;
a rotatable power source located on the chassis;
a feeder mounted to an end of the chassis in outwardly extending relation thereto for pivotal movement about a generally horizontal pivotal axis through a range of harvesting positions, the feeder including at least one rotatable element and an end opposite the chassis connectable to a header for supporting the header for movement with the feeder through the range of harvesting positions, the header including at least one rotatable element; and
a rotatable drive connected between the rotatable power source and the rotatable conveyor element, including a plurality of drive shafts connected in end to end relation rotatably connecting the power source to a rotatable input of a first gear box located on the feeder, the first gear box including at least one rotatable output rotatably connected to the input and to the at least one rotatable element of the feeder, and another rotatable output rotatably connected to the input and to a drive shaft connected to a rotatable input of a second gear box on the feeder connectable to the at least one rotatable element of the header, the plurality of drive shafts including a drive shaft having a first end connected by a universal joint to an end of another of the drive shafts, an opposite end connected by a universal joint to the input of the first gear box, and a center portion disposed about equidistant from the ends thereof, the center portion being positioned so as to be at least substantially coincident with the pivotal axis when the feeder is in a selected one of the harvesting positions.

12. The combine of claim 11, wherein the feeder includes a rock trap and the at least one rotatable element of the feeder includes a rotatable beater of the rock trap, one of the outputs of the first gear box being rotatably connected to the beater.

13. The combine of claim 11, wherein said one of the drive shafts, said another of the drive shafts and the input of the first gear box are substantially axially aligned when the feeder is at the selected one of the harvesting positions.

14. The combine of claim 11, wherein the rotatable power source comprises an internal combustion engine rotatably drivingly connected to a gear arrangement, the plurality of drive shafts including a drive shaft rotatably connected to the gear arrangement.

15. The combine of claim 11, wherein the first gear box, said another rotatable output thereof and the drive shaft connected to the input of the second gear box are positioned between a side of the feeder and an adjacent one of the wheels of the combine which is steerable, said another rotatable output and said drive shaft being axially offset from the input of the first gear box in a direction toward the feeder so as to provide a space for turning the steerable wheel toward the side of the feeder.

16. In an agricultural combine including a chassis supported on a plurality of wheels, a rotatable power source located on the chassis, and a feeder mounted to an end of the chassis in outwardly extending relation thereto for pivotal movement about a generally horizontal pivotal axis through a range of harvesting positions, the feeder including a rotatable conveyor element, and an end opposite the chassis connectable to a header for supporting the header for movement with the feeder through the range of harvesting positions, the header including at least one rotatable element, the improvement comprising:
a rotatable drive connected between the rotatable power source and the rotatable conveyor element, including a plurality of drive shafts extending in end to end relation connecting the power source to a rotatable input of a first gear box located on the feeder, the first gear box including at least one rotatable output rotatably connected to the input and to the at least one rotatable conveyor element, and another rotatable output rotatably connected to the input and to a transfer shaft connected to a rotatable input of a second gear box having an output rotatably connected to the input thereof and connectable to the at least one rotatable element of the header, the plurality of drive shafts including an input drive shaft having a first end including a universal joint connected to an end of another of the drive shafts, an opposite end including a universal joint connected to the input of the first gear box, and a center portion disposed about equidistant from the ends thereof, the center portion being positioned so as to be closely adjacent to the pivotal axis when the feeder is in a selected one of the harvesting positions.

17. In the combine of claim 16, the improvement further comprising the input drive shaft having a length as measured between the universal joints thereof which is no greater than about 12 inches.

18. In the combine of claim 16, the improvement further comprising the first gear box, said another rotatable output thereof and the transfer shaft being positioned between a side of the feeder and an adjacent one of the wheels of the combine which is steerable, said another rotatable output and said transfer shaft being axially offset from the input of the first gear box in a direction toward the feeder so as to provide a space for turning the steerable wheel toward the side of the feeder.

19. In the combine of claim 16, wherein the rotatable power source comprises an internal combustion engine rotatably drivingly connected to a gear arrangement, the improvement further comprising one of the plurality of drive shafts being rotatably connected to the gear arrangement.

20. In the combine of claim 16, the improvement further comprising said one of the drive shafts, said another of the drive shafts, and the input of the first gear box being substantially axially aligned when the feeder is in the selected one of the harvesting positions.

21. In the combine of claim 16, the range of harvesting positions comprising about 8 degrees of pivotal movement about the pivotal axis, and the improvement further comprising the selected one of the harvesting positions being a middle position within the range.

* * * * *